US010062065B2

(12) United States Patent
Doi et al.

(10) Patent No.: US 10,062,065 B2
(45) Date of Patent: Aug. 28, 2018

(54) SETTLEMENT SYSTEM

(75) Inventors: Kazuhiro Doi, Himeji (JP); Minoru Higashiyama, Himeji (JP); Masatsugu Yokotani, Himeji (JP); Keiju Nakagawa, Tatsuno (JP)

(73) Assignee: GLORY LTD., Himeji-shi, Hyogo-ken (JP)

( * ) Notice: Subject to any disclaimer, the term of this patent is extended or adjusted under 35 U.S.C. 154(b) by 410 days.

(21) Appl. No.: 13/550,647

(22) Filed: Jul. 17, 2012

(65) Prior Publication Data
US 2013/0024304 A1 Jan. 24, 2013

(30) Foreign Application Priority Data

Jul. 19, 2011 (JP) ................................. 2011-158185

(51) Int. Cl.
| | |
|---|---|
| G06Q 20/08 | (2012.01) |
| G06Q 20/20 | (2012.01) |
| G07G 1/00 | (2006.01) |
| G07G 1/14 | (2006.01) |
| G06Q 20/00 | (2012.01) |

(52) U.S. Cl.
CPC ......... *G06Q 20/202* (2013.01); *G07G 1/0036* (2013.01); *G07G 1/14* (2013.01)

(58) Field of Classification Search
USPC ........................................................ 705/16
See application file for complete search history.

(56) References Cited

U.S. PATENT DOCUMENTS

| | | | | |
|---|---|---|---|---|
| 4,471,434 A | * | 9/1984 | Iwawaki | ......................... 705/16 |
| 4,893,237 A | * | 1/1990 | Unno | .............................. 705/21 |
| 5,494,136 A | * | 2/1996 | Humble | ................... A47F 9/047 |
| | | | | 186/61 |
| 6,354,496 B1 | * | 3/2002 | Murphy | ............... G06Q 20/343 |
| | | | | 235/380 |
| 6,386,448 B1 | * | 5/2002 | Addy | ................... G07G 1/0036 |
| | | | | 235/378 |
| 8,290,814 B2 | * | 10/2012 | Walter et al. | ................... 705/16 |

FOREIGN PATENT DOCUMENTS

| | | |
|---|---|---|
| EP | 0 167 860 A2 | 1/1986 |
| EP | 1 528 519 A2 | 5/2005 |
| FR | 2 596 553 A1 | 10/1987 |
| GB | 2 119 988 A | 11/1983 |
| JP | 2005-242634 | 9/2005 |

OTHER PUBLICATIONS

European Search Report (Application No. 12176862.6) (6 pages—dated Jun. 12, 2012).
European Office Action (Application No. 12 176 862.6) (6 pages—dated Jun. 12, 2017).
European Patent Office Summons to attend oral proceedings pursuant to Rule 115(1) EPC (9 pages—dated Jun. 28, 2018).

* cited by examiner

*Primary Examiner* — Scott A Zare
(74) *Attorney, Agent, or Firm* — Renner, Kenner, Greive, Bobak, Taylor & Weber

(57) ABSTRACT

To provide a settlement system capable of being switched between a cash desk payment style and a pay station payment style at a given timing in the same store. The present invention is a settlement system including a cash settlement apparatus and a cash register, wherein a layout is capable of being switched between a cash desk payment style in which the cash settlement apparatus is incorporated in a cash register lane, and a pay station payment style in which the cash settlement apparatus is separated from the cash register lane.

5 Claims, 8 Drawing Sheets

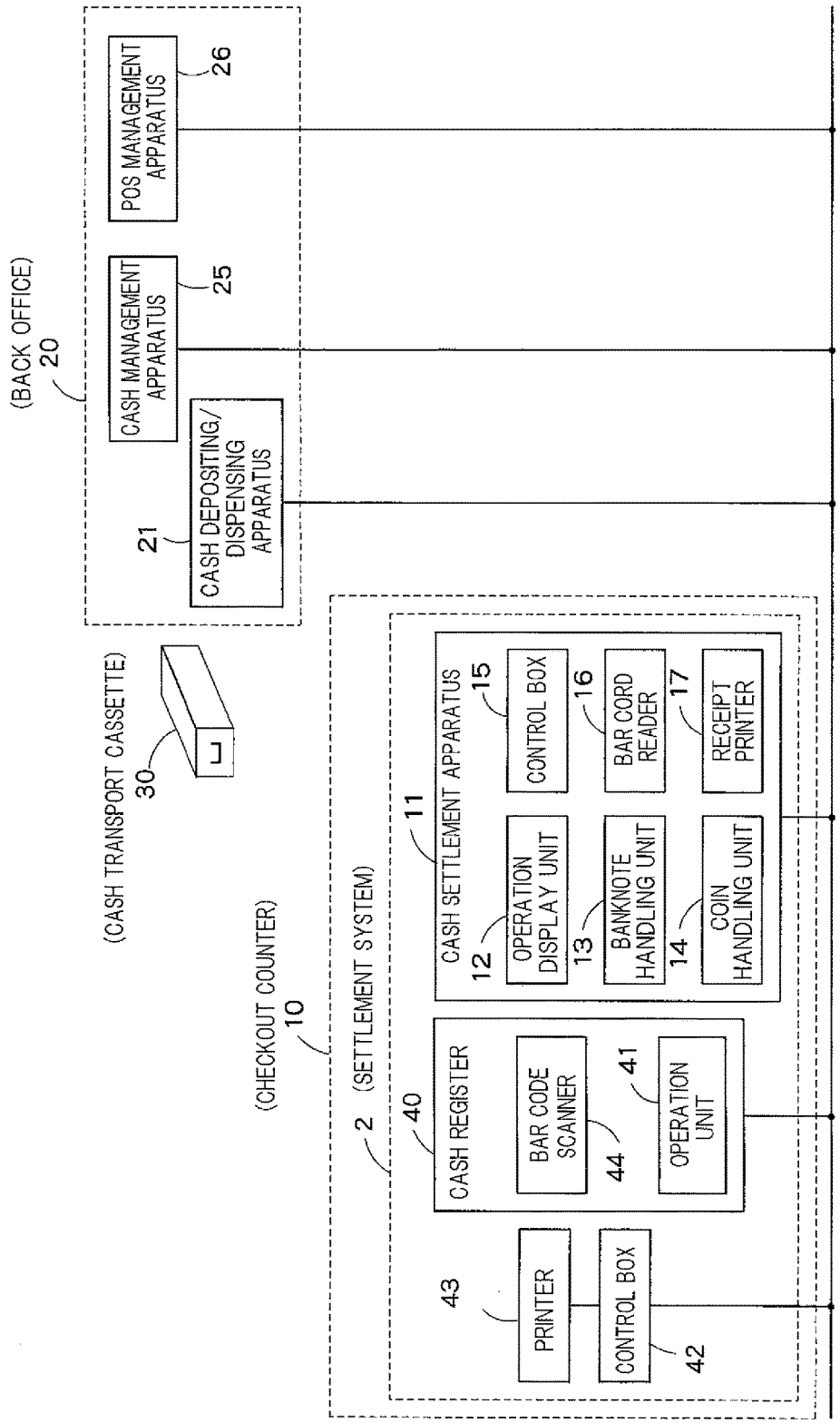
F I G. 1

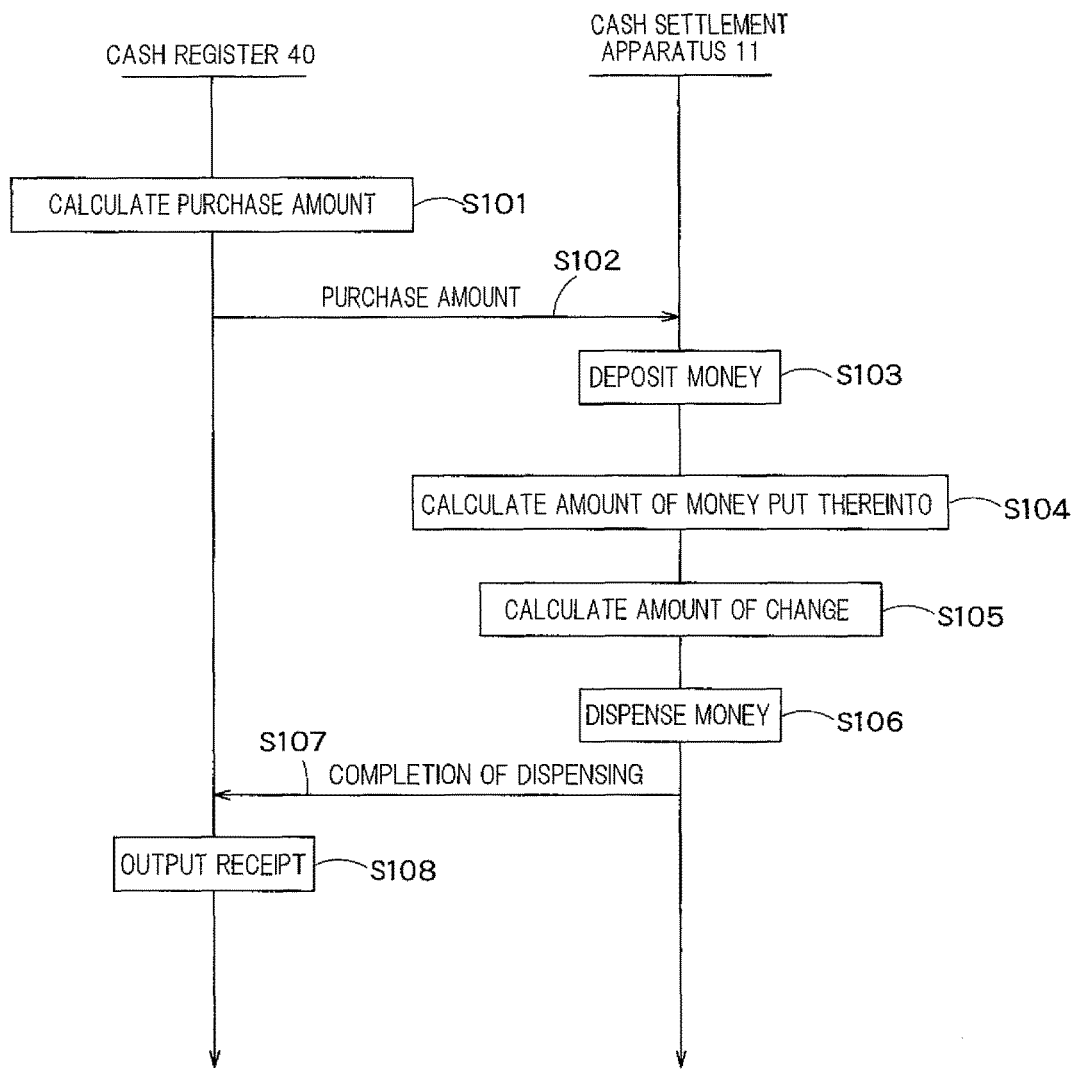
F I G. 2

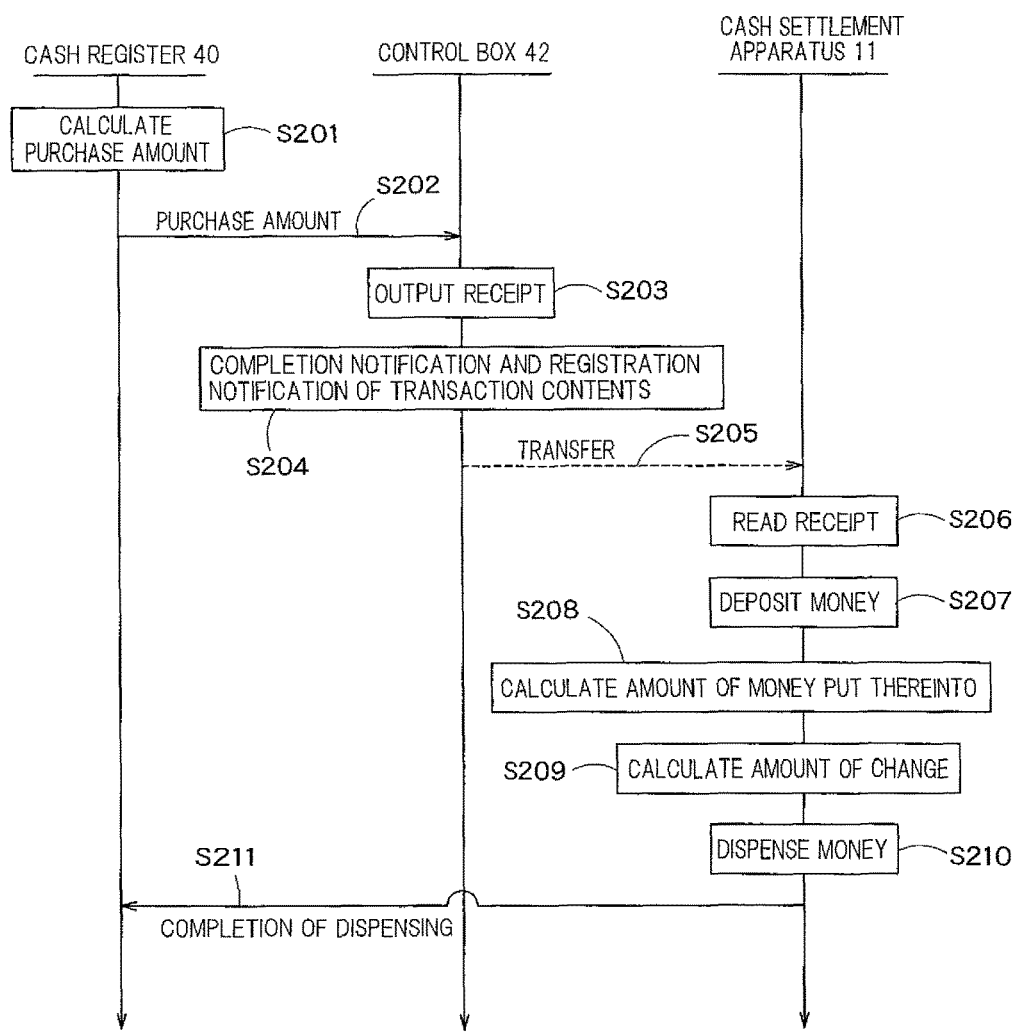
F I G. 3

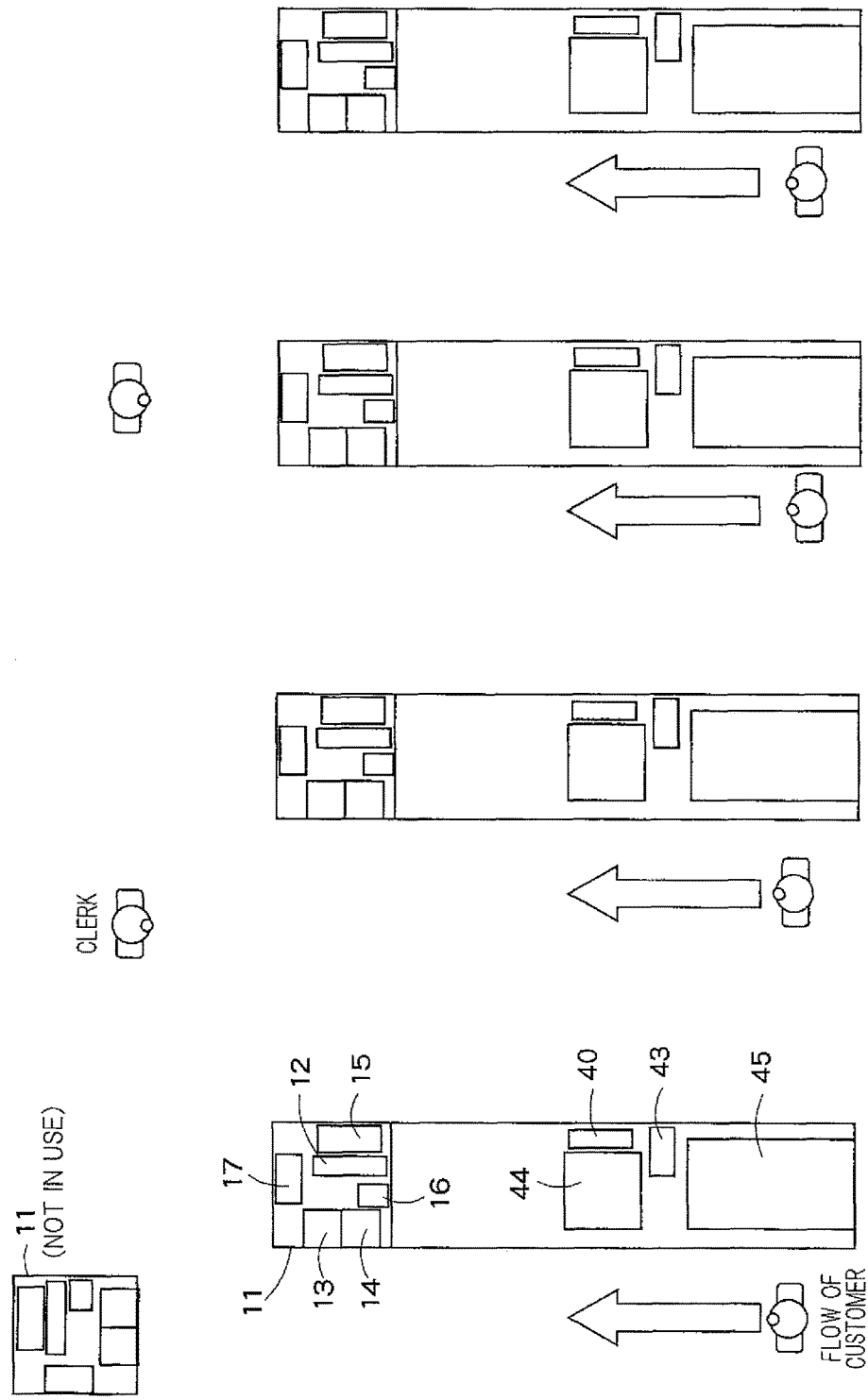
F I G. 7

SETTLEMENT SYSTEM

FIELD OF THE INVENTION

The present invention relates to a settlement system including a cash settlement apparatus configured to perform a money depositing operation and a money dispensing operation, and a cash register configured to cash register a purchased article and calculate a total amount thereof.

BACKGROUND ART

In a store such as a supermarket or a convenience store, there is provided a settlement system including a cash settlement apparatus configured to perform a banknote depositing operation, a banknote dispensing operation, a coin depositing operation and a coin dispensing operation, and a POS (Point Of Sale) cash register configured to cash register an article purchased by a customer and to calculate a sales amount.

An example of a settlement process by using such a settlement system is described. The POS cash register firstly calculates a sales amount, and notifies the cash settlement apparatus of the calculated sales amount. When money from a customer is put into the cash settlement apparatus, the cash settlement apparatus recognizes and counts the money. Then, the cash settlement apparatus subtracts the sales amount, which has been informed by the POS cash register, from a total amount of money from the customer so as to calculate a change amount. Then, the cash settlement apparatus dispenses a change.

The following two styles are typically known as a layout of a settlement system. One is a cash desk payment style in which a cash settlement apparatus is incorporated in a cash register lane (see FIG. 7) and the other is a pay station payment style in which a cash settlement apparatus is separated from a cash register lane (see FIG. 8).

In the case of the cash desk payment style, a POS cash register and a cash settlement apparatus correspond to each other in a one on one relationship, and operations are sequentially performed for each customer. Namely, after an article registration operation has been performed by the POS cash register, a payment operation is performed by the cash settlement apparatus. Thus, when one is operated, the other is generally not operated. Therefore, when one of the article registration operations and the payment operation takes time, the cash desk payment style is not efficient. On the other hand, in the case of the pay station payment style, the POS cash register and the cash settlement apparatus do not correspond to each other in a one on one relationship. Thus, by pausing one of the POS cash register and the cash settlement apparatus depending on a used condition so that the number of clerks can be reduced, the settlement system can be efficiently used.

In general, any one of the styles is selected, and the settlement system is installed. Namely, once the settlement system is installed in a store, the settlement system is fixedly used in any one of the cash desk payment style and the pay station payment style.

In order to make flexible assignment of clerks or the like with respect to the settlement system, JP3698362B proposes that a rotating member is employed in the settlement system. Due to the rotating member, reading of article information can be switched between a customer side and a cashier side.

In addition, JP4028773B proposes an apparatus in which an operation thereof by a customer/clerk can be switched in a checkout station.

In addition, JP4482710B proposes a POS apparatus including a rotating member in which an operation thereof is switched between a customer side and a cashier side by means of the rotating member.

In addition, JP2009-187274A proposes a POS cash register table in which layout of a POS cash register and equipments thereof (shopping bags and so on) can be changed.

In addition, JP2000-149090A proposes a change machine in which an outlet from which a customer receives a change and an inlet through which a clerk puts money paid by a customer are located in opposite directions.

In addition, JP2005-242634A proposes a checkout system which can cope with a change in the number of operators.

SUMMARY OF THE INVENTION

As described above, the conventional techniques propose that, assignment of clerks can be changed (made flexible) by, e.g., partially employing a movable structure, and that an operation (application) of an apparatus by customer/clerk is switched.

However, there has been conventionally no idea that the cash desk payment style and the pay station payment style are suitably shifted to each other in the same store.

The present invention has been made in view of the above circumstances. The object of the present invention is to provide a settlement system in which the cash desk payment style and the pay station payment style can be switched to each other at a given timing in the same store.

The present invention is a settlement system including a cash settlement apparatus and a cash register, wherein a layout is capable of being switched between a cash desk payment style in which the cash settlement apparatus is incorporated in a cash register lane, and a pay station payment style in which the cash settlement apparatus is separated from the cash register lane.

According to the present invention, the settlement system is configured to be capable of being previously switched between the cash desk payment style and the pay station payment style. Thus, the cash desk payment style and the pay station payment style can be switched to each other significantly easily, at a given timing, e.g., upon remodeling of a scale of a store. Moreover, the cash desk payment style and the pay station payment style can be switched to each other every day of the week, depending on the number of customers on the day of the week. Furthermore, the cash desk payment style and the pay station payment style can be switched to each other more frequently, i.e., every time zone.

In particular, when the pay station payment style is employed, the number of cash settlement apparatuses can be reduced (less) relative to the number of cash registers (the number of cash register lanes).

Preferably, the cash register includes a switching unit configured to control the layout switching, a control box is located in the vicinity of the cash register, and the cash register is configured to transmit and receive data to and from the cash settlement apparatus in the case of the cash desk payment style, and is configured to transmit and receive data to and from the control box in the case of the pay station payment style.

In this case, to be more specific, for example, a transaction-specifying-medium outputting unit is located in the vicinity of the cash register, and the control box is configured to cause the transaction-specifying-medium outputting unit to output a transaction specifying medium, then to perform a transaction completion notification to the cash register, and to perform a registration and notification of transaction contents to a management apparatus, in the case of the pay station payment style.

In this case, after the respective constituent apparatuses have been transferred to suitable positions without changing a wire connection condition among the respective constituent apparatuses, the cash desk payment system and the pay station payment system can be switched to each other, only by operating the switching unit of the cash register.

Alternatively, preferably, the cash settlement apparatus includes a switching unit configured to control the layout switching, a transaction-specifying-medium outputting unit is located in the vicinity of the cash register, and the cash settlement apparatus is configured to perform a settlement process in the case of the cash desk payment style, and is configured to give an output command to the transaction-specifying-medium outputting unit.

In this case, to be more specific, for example, the cash settlement apparatus is configured to perform a registration and notification of transaction contents to a management apparatus.

In this case, after the respective constituent apparatuses have been transferred to suitable positions without changing a wire connection condition among the respective constituent apparatuses, the cash desk payment system and the pay station payment system can be switched to each other, only by operating the switching unit of the cash settlement apparatus.

Alternatively, preferably, a control box is located in the vicinity of the cash register, and apparatus specifying information of the control box with respect to the cash register is rewritable into apparatus specifying information of the cash settlement apparatus with respect to the cash register.

In this case, to be more specific, for example, a transaction-specifying-medium outputting unit is located in the vicinity of the cash register, and the control box is configured to cause the transaction-specifying-medium outputting unit to output a transaction specifying medium, then to perform a transaction completion notification to the cash register, and to perform a registration and notification of transaction contents to a management apparatus, in the case of the pay station payment style.

In this case, after the respective constituent apparatuses have been transferred to suitable positions without changing a wire connection condition among the respective constituent apparatuses, the cash desk payment system and the pay station payment system can be switched to each other, only by means of the rewriting operation of the apparatus specifying information.

According to the present invention, the settlement system is configured to be capable of being previously switched between the cash desk payment style and the pay station payment style. Thus, the cash desk payment style and the pay station payment style can be switched to each other significantly easily, at a given timing, e.g., on season and off season, correspondingly to the number of available clerks, or upon remodeling of a scale of a store.

BRIEF DESCRIPTION OF THE DRAWINGS

FIG. 1 is a block view showing a structural example of a cash management system including a settlement system according to a first embodiment of the present invention;

FIG. 2 is a timing chart for explaining an example of a settlement method, when the cash management system in FIG. 1 is utilized in a cash desk payment style;

FIG. 3 is a timing chart for explaining an example of a settlement method, when the cash management system in FIG. 1 is utilized in a pay station payment style;

FIG. 7 is an overview showing an example of the cash desk payment style; and

DETAILED DESCRIPTION OF THE INVENTION

Figure 4:
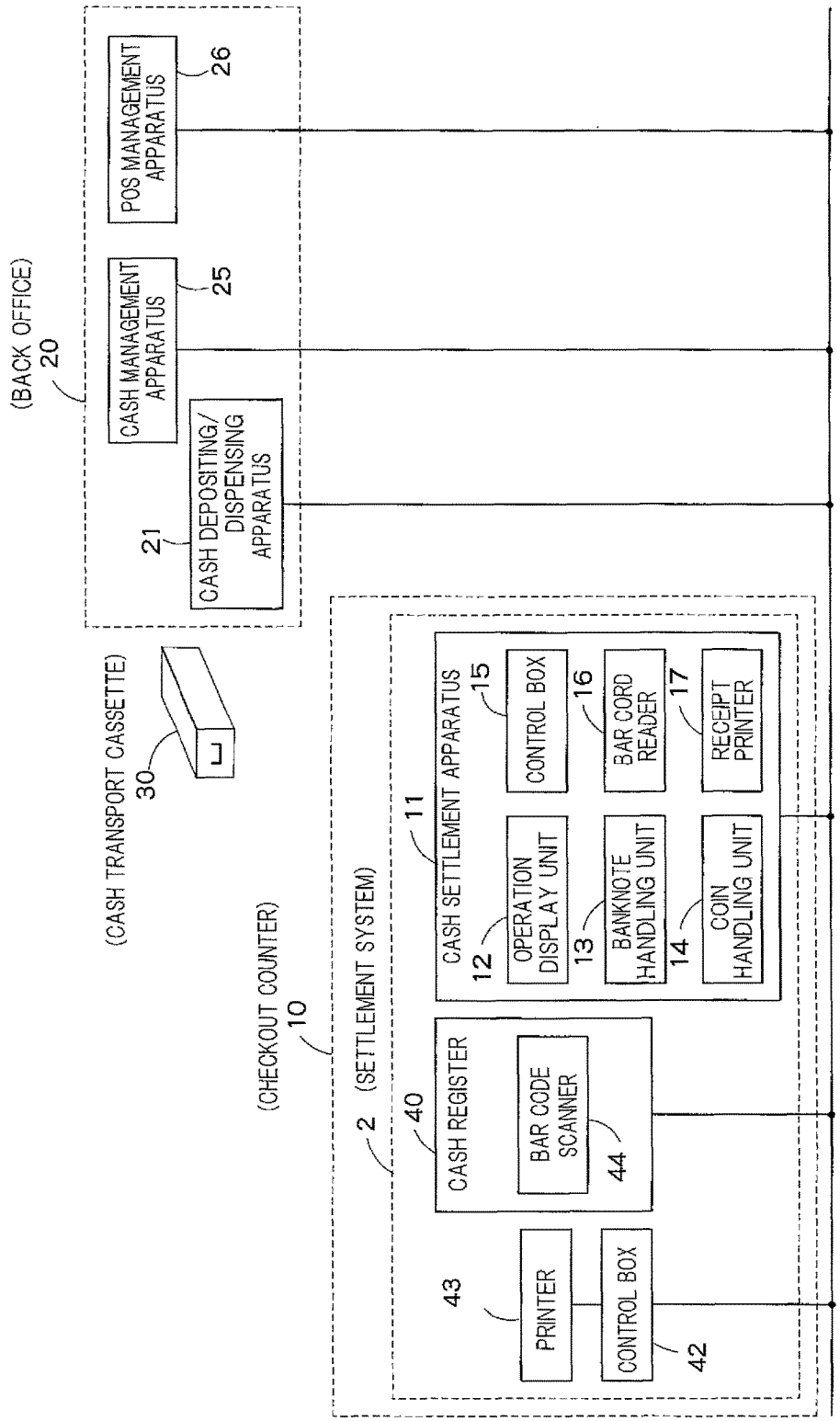
FIG. 4 is a block view showing a structural example of a cash management system including a settlement system according to a second embodiment of the present invention.

Embodiments according to the present invention will be described herebelow with reference to the drawings. Note that these embodiments do not intend to limit the present invention.

FIG. 1 is a block view showing a structural example of a cash management system 1 including a settlement system 2 according to the first embodiment of the present invention. The cash management system 1 is a system configured to handle and manage a cash received by a clerk from a customer and a cash to be paid by the clerk to the customer.

The cash management system 1 is installed in a checkout area in a store. The cash management system 1 is composed of a checkout counter 10 to which a clerk deposits a cash paid by a customer and from which a cash to be paid to the customer is dispensed, a back office 20 configured to manage a cash of the checkout counter 10 and an article for sale, and a cash transport cassette 30 configured to transport a cash between the checkout counter 10 and the back office 20.

In the checkout counter 10, there is installed the settlement system 2 including a cash settlement apparatus 11 configured to deposit and dispense a cash so as to perform a settlement process with respect to a customer, and a cash register 40 that is connected to the cash settlement apparatus 11 so as to be able to communicate with each other, and is configured to cash register an article to be purchased by a customer. Plural sets of the settlement systems 2 may be provided.

The cash settlement apparatus 11 is operated by a clerk or a customer himself/herself, and is used in a settlement process between the clerk and the customer. For example, the cash settlement apparatus 11 deposits money paid by the customer or dispenses a change to be paid to the customer. In more detail, as shown in FIG. 1, the cash settlement apparatus 11 includes an operation display unit 12, a banknote handling unit 13, a coin handling unit 14, a control box 15, a bar code reader 16 and a receipt printer 17. The control box 15 is configured to control the respective elements of the cash settlement apparatus 11.

The cash register 40 is, for example, a POS cash register operated by a clerk. The cash register 40 includes an operation unit 41 and a bar code scanner 44 which will be described below.

A cash depositing/dispensing apparatus 21, a cash management apparatus 25 and a POS management apparatus are disposed in the back office 20. The cash depositing/dispensing apparatus 21 is connected to the cash settlement apparatus 11 so as to be able to communicate with each other. For example, the cash depositing/dispensing apparatus 21 dispenses a change fund to be loaded into the cash settlement apparatus 11 or deposits sales proceeds collected from the cash settlement apparatus 11.

The cash management apparatus 25 is connected to the cash settlement apparatus 11 and the cash depositing/dispensing apparatus 21 so as to be able to communicate with each other, through a LAN (Local Area Network) or the like. The cash management apparatus 25 manages a cash stored in the cash settlement apparatus 11 and a cash stored in the cash depositing/dispensing apparatus 21. For example, the cash management apparatus 25 manages a cash that has been settled in each cash settlement apparatus 11, and a cash transferred between the cash settlement apparatus 11 and the cash depositing/dispensing apparatus 21. The cash management apparatus 25 may monitor whether the cash transport cassette 30 is mounted on the cash settlement apparatus 11 or on the cash depositing/dispensing apparatus 21.

The POS management apparatus 26 is connected to the cash register 40 disposed in the checkout counter 10 so as to be able to communicate with each other, through a LAN or the like. The POS management apparatus 26 manages a flow of articles and sales proceeds of the store.

The cash transport cassette 30 is structured to be removably mounted on the cash settlement apparatus 11 and on the cash depositing/dispensing apparatus 21. When the cash transport cassette 30 is mounted on the cash settlement apparatus 11 or the cash depositing/dispensing apparatus 21, a cash can be transferred between the cash transport cassette 30 and the cash settlement apparatus 11 or the cash depositing/dispensing apparatus 21. On the other hand, when the cash transport cassette 30 is removed from the cash settlement apparatus 11 and the cash depositing/dispensing apparatus 21, the cash transport cassette 30 stores a cash such that the cash therein cannot be taken out therefrom. A clerk transports a cash between the cash settlement apparatus 11 and the cash depositing/dispensing apparatus 21 with the use of the cash transport cassette 30. For example, when a change fund is loaded or when sales proceeds are collected, a clerk transports a cash between the cash settlement apparatus 11 and the cash depositing/dispensing apparatus 21 with the use of the cash transport cassette 30. When the cash is transported, since the clerk cannot touch the cash in the cash transport cassette 30, the cash can be safely transported in terms of security.

The cash transport cassette 30 may be configured to transport any one of a banknote and a coin, or may be configured to transport both a banknote and a coin. The cash transport cassette for banknote 30 may be a cassette of a stacking type in which banknotes are stored in a stacked manner, or may be a cassette of a tape-reeling type which reels up a pair of tapes between which banknotes are sandwiched one by one. The cash transport cassette for coin 30 may be a cassette that stores coins of mixed denominations.

In this embodiment, the cash register 40 is provided with the operation unit 41 as a switching unit for controlling a layout switching. In the vicinity of the cash register 40, there are located the control box 42 and a printer 43 (transaction-specifying-medium outputting unit) configured to print a receipt as a transaction specifying medium. In the case of the cash desk payment style, the cash register 40 is configured to transmit and receive data to and from the cash settlement apparatus 11. On the other hand, in the case of the pay station payment style, the cash register 40 is configured to transmit and receive data to and from the control box 42. In addition, in the case of the cash desk payment style, the cash settlement apparatus 11 is configured to wait inputting of data from the cash register 40. On the other hand, in the case of the pay station payment style, the cash settlement apparatus 11 is configured to wait reading of a receipt (the cash settlement apparatus 11 has a bar code reader 16).

Further, in the case of the pay station payment style, the control box 42 in this embodiment is configured to; cause the printer 43 to print a receipt, then perform a transaction completion notification to the cash register 40, and perform a registration and notification of transaction contents to the cash management apparatus 25.

Next, a settlement method by means of such a settlement system 2 including the cash settlement apparatus 11 and the cash register 40 is described with reference to FIGS. 2 and 3.

Firstly, there is described a case in which the settlement system 2 is located in the cash desk payment style (see FIG. 7). Namely, there is described a case in which the cash desk payment style is selected through the operation unit 41 of the cash register 40, and the respective constituent apparatuses (the cash register 40, the cash settlement apparatus 11 and so on) are located correspondingly. In the example of FIG. 7, there is one surplus cash settlement apparatus 11 which is not in use. In FIG. 7, the reference number 45 depicts a conveyor for conveying an article for sale.

(Step S101)

Article information of an article(s) to be purchased by a customer is cash registered in the cash register 40 through, e.g., the bar code scanner 44, and a purchase amount of articles is calculated.

(Step S102)

The cash register 40 transmits the purchase amount of articles to the cash settlement apparatus 11. (The bar code reader 16 of the cash settlement apparatus 11 is not used.)

(Step S103)

Money paid by the customer is put into the banknote handling unit 13 or the coin handling unit 14 of the cash settlement apparatus 11. The operation of putting money thereinto may be performed by the clerk or the customer himself/herself. The cash settlement apparatus 11 performs a depositing operation including a recognizing and counting operation of the money put thereinto.

(Step S104)

The cash settlement apparatus 11 calculates an amount of money put thereinto.

(Step S105)

The cash settlement apparatus 11 regards the amount of money put thereinto, which has been calculated in the step S104, as a total amount of money from the customer, and calculates an amount of change based on the total amount of money and the purchase amount of articles, which has been received from the cash register 40 in the step S102.

(Step S106)

The cash settlement apparatus 11 dispenses change money based on the amount of change which has been calculated in the step S105. The clerk may deliver the change money to the customer by hand, or the customer himself/herself may receive the dispensed change money.

(Step S107)

The cash settlement apparatus 11 notifies the cash register 40 and the cash management apparatus 25 of a completion of the dispensing of change money, i.e., a completion of the cash settlement.

(Step S108)

Based on the control of the cash register 40, the printer 43 outputs a receipt on which transaction contents are printed, which include the article information of the articles purchased by the customer, the purchase amount of articles, the amount of money paid by the customer, the amount of change and so on. The customer takes the receipt by himself/herself or the clerk delivers the outputted receipt to the customer by hand. The receipt may be outputted from the receipt printer 17 of the cash settlement apparatus 11.

Figure 8:
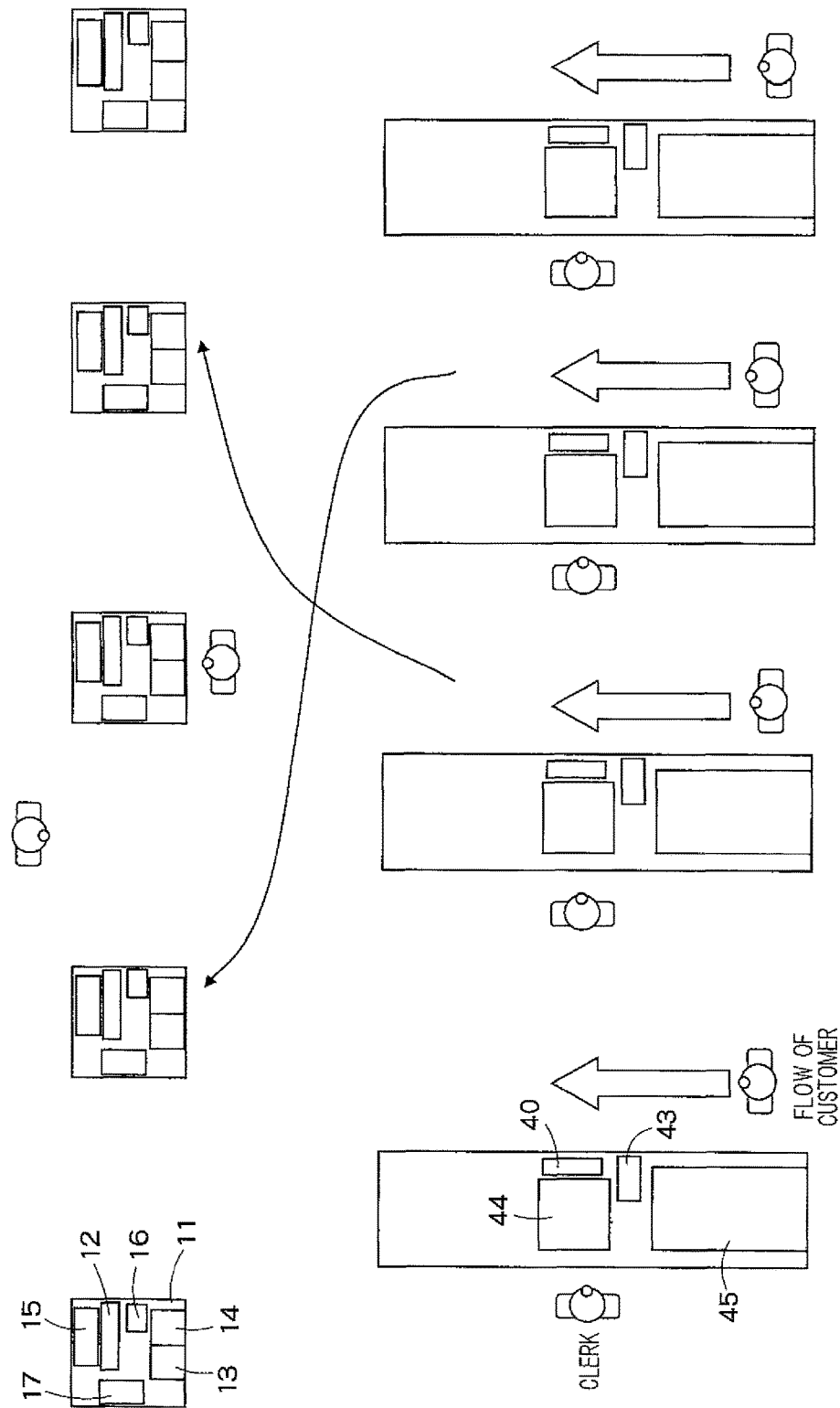
FIG. 8 is an overview showing an example of the pay station payment style.

Next, a procedure for shifting to the pay station payment style (see FIG. 8) is described. According to this embodiment, the shift to the pay station payment style can be achieved by a significantly simple action. Specifically, the cash desk payment style is switched to the pay station payment style through the operation unit 41 of the cash register 40, and positions of the respective constituent apparatuses (the cash register 40, the cash settlement apparatus 11 and so on) are changed correspondingly. The shift to the pay station payment style can be achieved only by the above action, i.e., without any laborsome operations such as changing of a wiring connection condition among the respective constituent apparatuses and/or modifying of a control program. Similarly, it is also possible to return to the cash desk payment style without any laborsome operations such as changing of a wiring connection condition among the respective constituent apparatuses and/or modifying of the control program. In the example of FIG. 8, the cash settlement apparatuses 11 whose number is larger than that of the cash registers 40 are available.

A settlement method in the pay station payment style is described with reference to FIG. 3.

(Step S201)

Article information of an article(s) to be purchased by a customer is cash registered in the cash register 40 through, e.g., the bar code scanner 44, and a purchase amount of articles is calculated.

(Step S202)

The cash register 40 transmits the purchase amount of articles, not to the cash settlement apparatus 11, but to the control box 42 (this shift of transmission destination is caused by the switching operation of the operation unit 41 of the cash register 40).

(Step S203)

The control box 42 causes the printer 43 to print a receipt on which transaction contents are printed, which include the article information of the articles to be purchased by the customer, the purchase amount of articles and so on. In this embodiment, the purchase amount of articles is also printed as bar code information.

(Step S204)

Further, the control box 42 performs a transaction completion notification to the cash register 40, and performs a transaction contents registration and notification to the cash management apparatus 25.

(Step S205)

The customer takes the receipt by himself/herself or receives the printed receipt by hand from the clerk. Then, the customer transfers to the cash settlement apparatus 11 that is located separately from the cash register 40.

(Step S206)

The customer causes the bar code reader 16 of the cash settlement apparatus 11 to read the bar code information on the receipt.

(Step S207)

Money paid by the customer is put into the banknote handling unit 13 or the coin handling unit 14 of the cash settlement apparatus 11. The operation of putting money thereinto is generally performed by the customer himself/herself. The cash settlement apparatus 11 performs a depositing operation including a recognizing and counting operation of the money put thereinto.

(Step S208)

The cash settlement apparatus 11 calculates an amount of money put thereinto.

(Step S209)

The cash settlement apparatus 11 regards the amount of money put thereinto, which has been calculated in the step S208, as a total amount of money from the customer, and calculates an amount of change based on the total amount of money and the purchase amount of article obtained from the bar code information.

(Step S210)

The cash settlement apparatus 11 dispenses change money based on the amount of change which has been calculated in the step S209. The dispensed change money is generally received by the customer himself/herself.

(Step S211)

The cash settlement apparatus 11 notifies the cash register 40 and the cash management apparatus 25 of a completion of the dispensing of change money, i.e., a completion of cash settlement. Then, a receipt showing the completion of cash settlement is outputted from the receipt printer 17 of the cash settlement apparatus 11.

As described above, according to this embodiment, the settlement system 20 is configured to be capable of being previously switched between the cash desk payment style and the pay station payment style, by the operation unit 41 of the cash register 40. Thus, the cash desk payment style and the pay station payment style can be switched to each other significantly easily, at a given timing, e.g., on season and off season, correspondingly to the number of available clerks, or upon remodeling of a scale of the store. Moreover, the cash desk payment style and the pay station payment style can be switched to each other every day of the week, depending on the number of customers on the day of the week. Furthermore, the cash desk payment style and the pay station payment style can be switched to each other more frequently, i.e., every time zone.

FIG. 4 is a block view showing a structural example of a cash management system 1 including a settlement system 2 according to the second embodiment of the present invention.

As shown in FIG. 4, in this embodiment, an operation display unit 12 of a cash settlement apparatus 11 functions as a switching unit for controlling a layout switching. The other structures of the cash settlement apparatus 11 are the same as those of the first embodiment shown in FIG. 1. Similarly to the first embodiment, in the vicinity of a cash register 40, a printer 43 (transaction-specifying-medium outputting unit) configured to print a receipt as a transaction specifying medium is disposed, but a control box is not disposed near thereto. In either case of the cash desk payment style or the pay station payment style, the cash register 40 in this embodiment is configured to transmit and receive data to and from the cash settlement apparatus 11. In the case of the cash desk payment style, the cash settlement apparatus 11 is configured to wait inputting of data from the cash register 40. On the other hand, in the case of the pay station payment style, the cash settlement apparatus 11 is configured to cause the printer 43 to print a receipt, and then to wait reading of the receipt.

The other structures in this embodiment are the same as those in the first embodiment. In FIG. 4, the same members as those in the first embodiment are shown by the same reference numbers of those in the first embodiment, and description of the same members is omitted.

Figure 5:
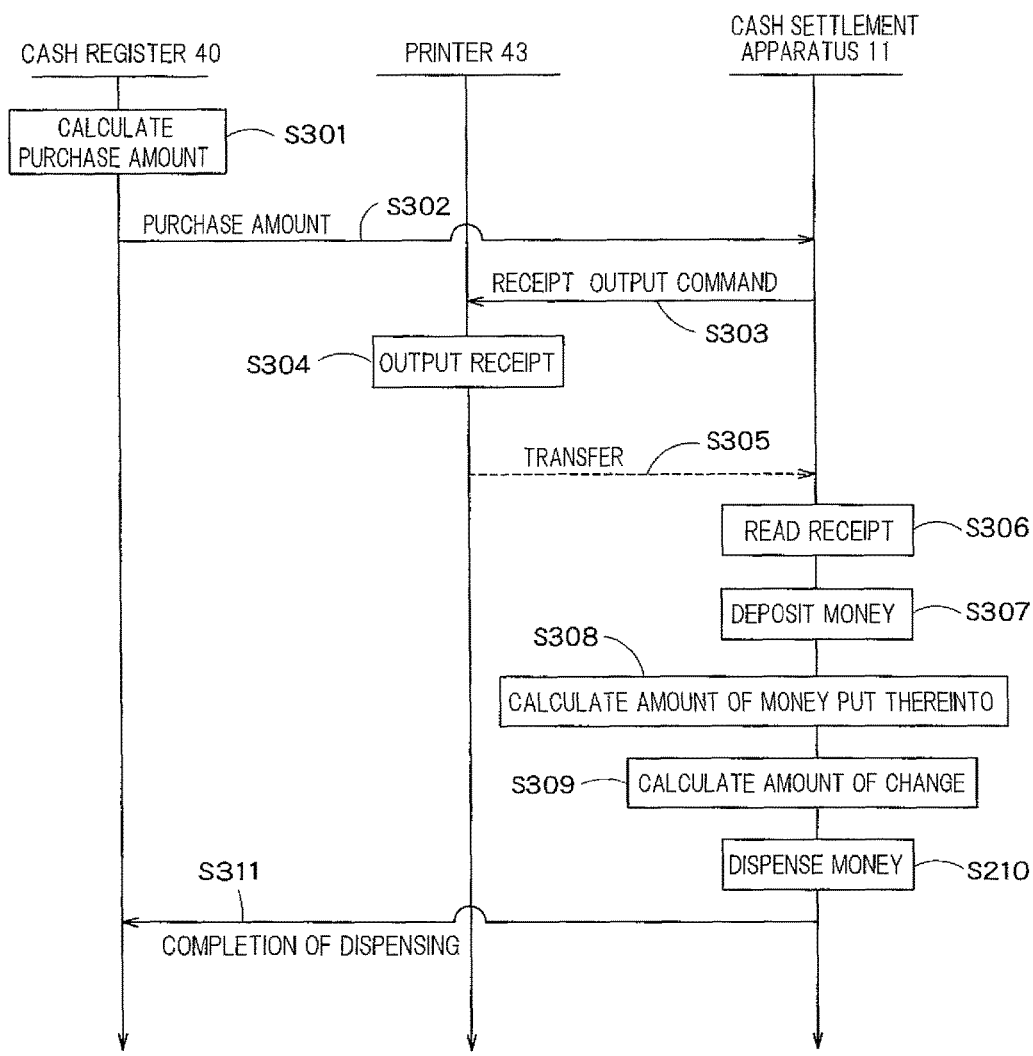
FIG. 5 is a timing chart for explaining an example of a settlement method, when the cash management system in FIG. 4 is utilized in the pay station payment style.

Next, a settlement method by means of such a settlement system 2 including the cash settlement apparatus 11 and the cash register 40 is described with reference to FIGS. 2 and 5.

When the settlement system 2 is located in the cash desk payment style (see FIG. 7), the settlement method is the same as that of the first embodiment described with reference to FIG. 2.

Next, a procedure for shifting to the pay station payment style (see FIG. 8) is described. According to this embodiment, the shift to the pay station payment style can be achieved by a significantly simple action. Specifically, the cash desk payment style is switched to the pay station payment style through the operation display unit 12 of the cash settlement apparatus 11, and the positions of the respective constituent apparatuses (the cash register 40, the cash settlement apparatus 11 and so on) are changed correspondingly. The shift to the pay station payment style can be achieved only by the above action, i.e., without any laborsome operations such as changing of a wiring connection condition among the respective constituent apparatuses and/or modifying of a control program. Similarly, it is also possible to return to the cash desk payment style without any labor some operations such as changing of a wring connection condition among the respective constituent apparatuses and/or modifying of the control program.

A settlement method in the case of the pay station payment style is described with reference to FIG. 5.

(Step S301)
Article information of an article(s) to be purchased by a customer is cash registered in the cash register 40 through, e.g., the bar bode scanner 44, and a purchase amount of articles is calculated.

(Step S302)
The cash register 40 transmits the purchase amount of articles to the cash settlement apparatus 11.

(Step S303)
The cash settlement apparatus 11 transmits a receipt printing command to the printer 43.

(Step S304)
The printer 43 prints a receipt.

(Step S305)
The customer takes the receipt by himself/herself or receives the printed receipt by hand from the clerk. Then, the customer transfers to the cash settlement apparatus 11 that is located separately from the cash register 40.

(Step S306)
The customer causes the bar code reader 16 of the cash settlement apparatus 11 to read the bar code information on the receipt.

(Step S307)
Money paid by the customer is put into the banknote handling unit 13 or the coin handling unit 14 of the cash settlement apparatus 11. The operation of putting money thereinto is performed by the customer himself/herself. The cash settlement apparatus 11 performs a depositing operation including a recognizing and counting operation of the money put thereinto.

(Step S308)
The cash settlement apparatus 11 calculates an amount of money put thereinto.

(Step S309)
The cash settlement apparatus 11 regards the amount of money put thereinto, which has been calculated in the step S308, as a total amount of money from the customer, and calculates an amount of change based on the total amount of money and the purchase amount of article obtained from the bar code information.

(Step S310)
The cash settlement apparatus 11 dispenses change money based on the amount of change which has been calculated in the step S309. The dispensed change money is generally received by the customer himself/herself.

(Step S311)
The cash settlement apparatus 11 notifies the cash register 40 and the cash management apparatus 25 of a completion of the dispensing of change money, i.e., a completion of the cash settlement. Then, a receipt showing the completion of cash settlement is outputted from the receipt printer 17 of the cash settlement apparatus 11.

As described above, according to this embodiment, the settlement system 20 is configured to be capable of being previously switched between the cash desk payment style and the pay station payment style, by the operation display unit 12 of the cash settlement apparatus 11. Thus, the cash desk payment style and the pay station payment style can be switched to each other significantly easily, at a given timing, e.g., on season and off season, correspondingly to the number of available clerks, or upon remodeling of a scale of the store. Moreover, the cash desk payment style and the pay station payment style can be switched every day of the week, depending on the number of customers on the day of the week. Furthermore, the cash desk payment style and the pay station payment style can be switched to each other more frequently, i.e., every time zone.

Next, a cash management system 1 including a settlement system 2 according to the third embodiment of the present invention is described.

Similarly to the first embodiment, in this embodiment, as shown in FIG. 1, in the vicinity of a cash register 40, there are disposed a control box 42 and a printer 43 (transaction-specifying-medium outputting unit) configured to print a receipt as a transaction specifying medium. The cash register 40 has an operation unit 41 as a switching unit for controlling a layout switching. In this embodiment, as an operation corresponding to the layout switching, there is prepared (e.g., programmed) an operation for rewriting apparatus specifying information (e.g., a so-called IP address) of the control box 42 with respect to the cash register 40 into apparatus specifying information of the cash settlement apparatus 11 with respect to the cash register 40.

In the case of the cash desk payment style, the cash register 40 in this embodiment is configured to transmit and receive data to and from the cash settlement apparatus 11. On the other hand, in the case of the pay station payment style, the cash register 40 in this embodiment is configured to transmit and receive data to and from the control box 42, by the rewriting operation of the apparatus specifying information.

The other structures in this embodiment are the same as those in the first embodiment.

Figure 6:
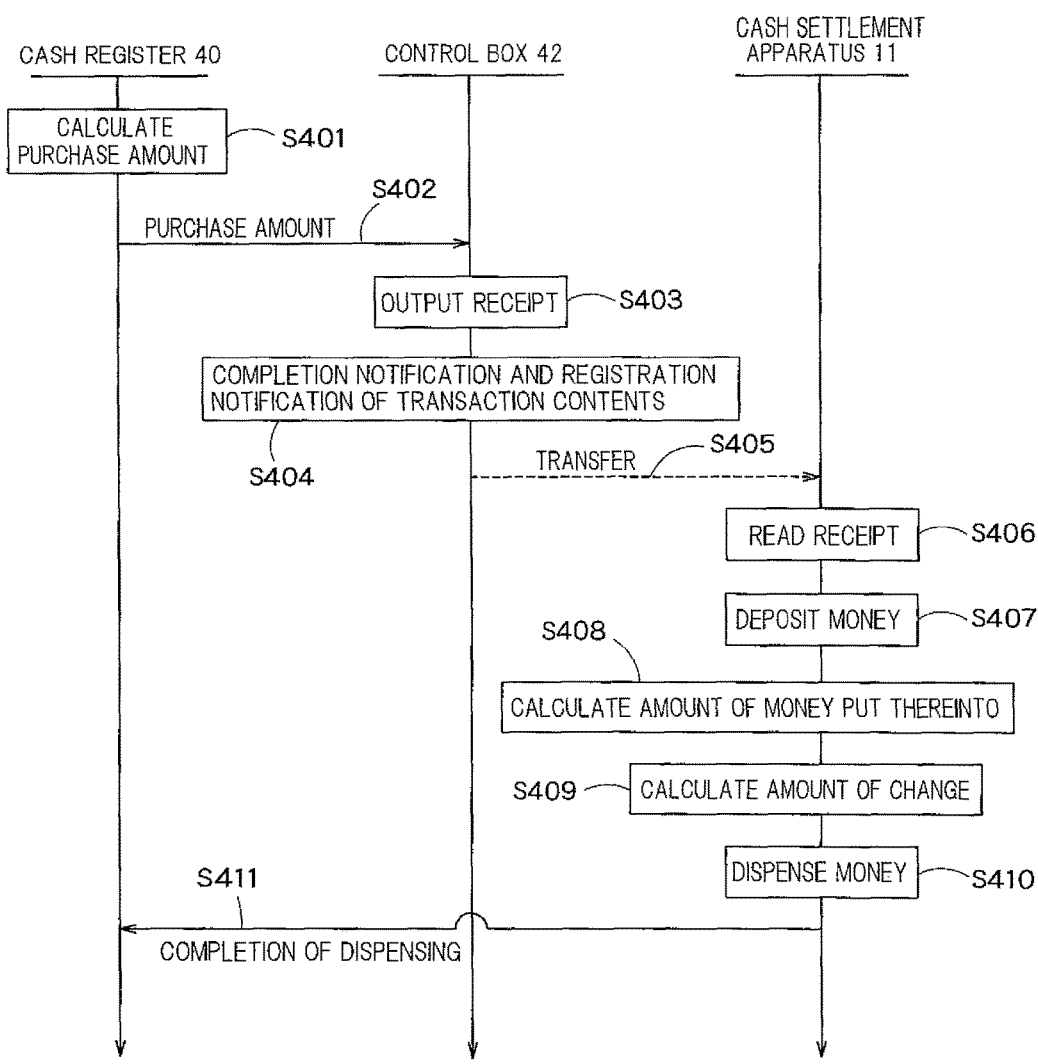
FIG. 6 is a timing chart for explaining an example of a settlement method, when the cash management system including a settlement system according to a third embodiment of the present invention is utilized in the pay station payment style.

Next, a settlement method by means of such a cash settlement system 2 including the cash settlement apparatus 11 and the cash register 40 is described with reference to FIGS. 2 and 6.

When the settlement system 2 is located in the cash desk payment style (see FIG. 7), the settlement method is the same as that of the first embodiment described with reference to FIG. 2.

Next, a procedure for shifting to the pay station payment style (see FIG. 8) is described. According to this embodiment, the shift to the pay station payment style can be achieved by a significantly simple action. Specifically, the apparatus specifying information of the control box 42 with respect to the cash register 40 is rewritten into the apparatus specifying information of the apparatus specifying information of the cash settlement apparatus 11 with respect to the cash register 40 through the operation unit 41 of the cash register 40, and the positions of the respective constituent apparatuses (the cash register 40, the cash settlement apparatus 11 and so on) are changed correspondingly. The shift to the pay station payment style can be achieved only by the above action, i.e., without any laborsome operations such as changing of a wiring connection condition among the respective constituent apparatuses and/or modifying of a control program. Similarly, it is also possible to return to the cash desk payment style without any labor some operations such as changing of a wring connection condition among the respective constituent apparatuses and/or modifying of the control program.

A settlement method in the case of the pay station payment style is described with reference to FIG. 6.

(Step S401)

Article information of an article(s) to be purchased by a customer is cash registered in the cash register 40 through, e.g., the bar code scanner 44, and a purchase amount of articles is calculated.

(Step S402)

When the cash register 40 intends to transmit the purchase amount of articles to the cash settlement apparatus 11, since the apparatus specifying information has been rewritten as described above, the purchase amount of articles is transmitted to the control box 42.

(Step S403)

The control box 42 causes the printer 43 to print a receipt on which transaction contents are printed, which include the article information of the articles to be purchased by the customer, the purchase amount of articles and so on. In this embodiment, the purchase amount of articles is also printed as bar code information.

(Step S404)

Further, the control box 42 performs a transaction completion notification to the cash register 40, and performs a transaction contents registration and notification to the cash management apparatus 25.

(Step S405)

The customer takes the receipt by himself/herself or receives the printed receipt by hand from the clerk. Then, the customer transfers to the cash settlement apparatus 11 that is located separately from the cash register 40.

(Step S406)

The customer causes the bar code reader 16 of the cash settlement apparatus 11 to read the bar code information on the receipt.

(Step S407)

Money paid by the customer is put into the banknote handling unit 13 or the coin handling unit 14 of the cash settlement apparatus 11. The operation of putting money thereinto is generally performed by the customer himself/herself. The cash settlement apparatus 11 performs a depositing operation including a recognizing and counting operation of the money put thereinto.

(Step S408)

The cash settlement apparatus 11 calculates an amount of money put thereinto.

(Step S409)

The cash settlement apparatus 11 regards the amount of money put thereinto, which has been calculated in the step S408, as a total amount of money from the customer, and calculates an amount of change based on the total amount of money and the purchase amount of article obtained from the bar code information.

(Step S410)

The cash settlement apparatus 11 dispenses change money based on the amount of change which has been calculated in the step S409. The dispensed change money is generally received by the customer himself/herself.

(Step S411)

The cash settlement apparatus 11 notifies the cash register 40 and the cash management apparatus 25 of a completion of the dispensing of change money, i.e., a completion of the cash settlement. Then, a receipt showing the completion of cash settlement is outputted from the receipt printer 17 of the cash settlement apparatus 11.

As described above, according to this embodiment, the settlement system 20 is configured to be capable of previously rewriting the apparatus specifying information of the control box into the apparatus specifying information of the cash settlement apparatus 11. Thus, the cash desk payment style and the pay station payment style can be switched to each other significantly easily, at a given timing, e.g., on season and off season, correspondingly to the number of available clerks, or upon remodeling of a scale of the store. Moreover, the cash desk payment style and the pay station payment style can be switched to each other every day of the week, depending on the number of customers on the day of the week. Furthermore, the cash desk payment style and the pay station payment style can be switched more frequently, i.e., every time zone.

As to the rewriting of the apparatus specifying information, an embodiment in which the apparatus specifying information set in the cash settlement apparatus 11 itself and the apparatus specifying information set in the control box 42 itself are rewritten can be employed, in addition to the embodiment in which the transmission destination information (e.g., an IP address) set in the cash register 40 is rewritten.

The present invention is not limited to the above embodiments as they are. When the present invention is embodied, the constituent elements can be modified without departing from the scope of the present invention. For example, in the settlement method in the case of the pay station payment style in the first to third embodiments, the purchase amount of articles by a customer is printed as bar code information and the bar code information is read by the cash settlement apparatus 11 so as to perform a settlement operation. However, the purchase amount of articles may be stored to be matched with predetermined ID information in the cash management apparatus 25 or the like. In this case, when the ID information is inputted in the cash settlement apparatus 11, the cash settlement apparatus 11 reads out the information of the purchase amount of articles stored to be matched with the ID information, so as to perform the settlement process. In addition, various inventions can be created by suitably combining the plurality of constituent elements disclosed in the above embodiments. For example, some constituent elements may be deleted from all the constituent elements shown in the embodiments. Further, constituent elements used in the different embodiments may be suitably combined.

What is claimed is:

1. A settlement system including:
a mobile cash settlement apparatus configured to perform a settlement process for a customer, and a cash register connected to the cash settlement apparatus to allow communication with each other, such that the cash register is configured to register an article purchased by the customer, wherein a layout is capable of being switched between a cash desk payment style in which the cash settlement apparatus is positioned adjacent to the cash register and incorporated in a cash register lane and in which the cash settlement apparatus and the cash register correspond to each other in a one on one relationship, and a pay station payment style in which the cash settlement apparatus is repositioned such that it is physically separated from the cash register and not incorporated into the cash register lane and in which the cash settlement apparatus and the cash register do not correspond to each other in a one on one relationship and in which the settlement process is performed by the customer himself or herself, the settlement system further including:
- a transaction-specifying-medium outputting unit configured to output a transaction-specifying-medium for specifying a transaction, and
- a transaction-specifying-medium reading unit configured to read the transaction-specifying medium, wherein the cash settlement apparatus performs the settlement process such that
  (i) when an operation to switch the pay station payment style to the cash desk payment style is performed, the transaction information is directly transmitted from the cash register to the cash settlement apparatus, and the cash settlement apparatus performs the settlement process based on a transaction information directly transmitted from the cash register,
  (ii) when an operation to switch the cash desk payment style to the pay station payment style is performed, the transaction-specifying-medium outputting unit outputs the transaction-specifying-medium on which the transaction information is recorded, the transaction-specifying-medium reading unit reads the transaction information recorded on the transaction-specifying-medium, and the cash settlement apparatus performs the settlement process based on the transaction information read by the transaction-specifying-medium reading unit.

2. The settlement system according to claim 1, wherein in the case of the cash desk payment style, the settlement system is operated by a customer himself/herself so that the customer performs a registration in the cash register and a settlement process in the cash settlement apparatus.

3. The settlement system according to claim 1, wherein the transaction-specifying-medium reading unit is not used when an operation to switch the pay station payment style to the cash desk payment style is performed.

4. The settlement system according to claim 1, wherein the transaction information includes a purchase amount of articles purchased by the customer.

5. The settlement system according to claim 1, wherein in the case of pay station payment style, the transaction information recorded on the transaction-specifying-medium includes an article information of articles to be purchased by the customer.

* * * * *